United States Patent
Diril et al.

(10) Patent No.: US 10,474,430 B2
(45) Date of Patent: Nov. 12, 2019

(54) MIXED-PRECISION PROCESSING ELEMENTS, SYSTEMS, AND METHODS FOR COMPUTATIONAL MODELS

(71) Applicant: Facebook, Inc., Menlo Park, CA (US)

(72) Inventors: Abdulkadir Utku Diril, Menlo Park, CA (US); Mikhail Smelyanskiy, Burlingame, CA (US); Nadav Rotem, Santa Clara, CA (US); Jong Soo Park, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 22 days.

(21) Appl. No.: 15/857,998

(22) Filed: Dec. 29, 2017

(65) Prior Publication Data

US 2019/0205094 A1 Jul. 4, 2019

(51) Int. Cl.
*G06F 7/544* (2006.01)
*G06F 7/523* (2006.01)
*G06N 3/08* (2006.01)
*G06N 5/02* (2006.01)

(52) U.S. Cl.
CPC ............. *G06F 7/523* (2013.01); *G06N 3/08* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 5,063,601 A | 11/1991 | Hayduk | |
| 5,216,751 A | 6/1993 | Gardner et al. | |
| 5,781,701 A | 7/1998 | Wang | |
| 6,584,482 B1* | 6/2003 | Hansen | G06F 9/30 |
| | | | 375/E7.268 |
| 9,153,230 B2 | 10/2015 | Maaninen | |
| 2016/0328645 A1 | 11/2016 | Lin et al. | |
| 2018/0032312 A1* | 2/2018 | Hansen | G06F 7/5045 |
| 2018/0315399 A1* | 11/2018 | Kaul | G06N 3/063 |
| 2019/0205094 A1* | 7/2019 | Diril | G06F 7/523 |

OTHER PUBLICATIONS

Artificial Neural Networks: A Tutorial, Anil K. Jain and Jianchang Mao, IEEE Computer Magazine (Mar. 1996), pp. 31-44.

* cited by examiner

Primary Examiner — David H Malzahn
(74) Attorney, Agent, or Firm — FisherBroyles, LLP

(57) ABSTRACT

The disclosed method may include (1) receiving a precision level of each weight associated with each input of a node of a computational model, (2) identifying, for each weight, one of a plurality of multiplier groups, where each multiplier group may include a plurality of hardware multipliers of a corresponding bit width, and where the corresponding bit width of the plurality of hardware multipliers of the one of the plurality of multiplier groups may be sufficient to multiply the weight by the associated input, and (3) multiplying each weight by its associated input using an available hardware multiplier of the one of the plurality of multiplier groups identified for the weight. Various other processing elements, methods, and systems are also disclosed.

19 Claims, 9 Drawing Sheets

US 10,474,430 B2

MIXED-PRECISION PROCESSING ELEMENTS, SYSTEMS, AND METHODS FOR COMPUTATIONAL MODELS

BACKGROUND

Artificial intelligence (AI) can enable computers to perform various complicated tasks, such as those related to cognitive functions that are typically associated with humans. These functions often involve making predictions or assessments based on real-world inputs. Several approaches to AI are prevalent, including machine learning techniques. Machine learning systems, in at least some examples, may be trained using known data sets rather than employing a specific predetermined algorithm to perform a task.

One machine learning model, referred to as an artificial neural network (ANN), is inspired by the interconnections of neurons in a biological brain. Typically, ANNs include multiple computational nodes arranged in interconnected layers, with each node modeling a neuron that may receive one or more inputs, process the inputs, and pass an output to the next layer, with the final layer producing a desired output. In some examples, each node may assign a weight to each of its inputs and then combine (e.g., sum) the weighted inputs to produce a result from that node. For example, if a task involves identifying a particular object in an image, filter weights may be trained to correspond to a probability that the input image includes the object.

To this end, ANNs and other machine learning systems may employ multiple dedicated hardware processing elements that may include multiply-accumulate (MAC) units or matrix-multiplication units to perform vector-vector multiplication and/or matrix-matrix multiplication operations (e.g., dot-product operations), thus making the use of machine learning systems more feasible, especially for complex tasks related to computer vision or natural language processing. Nonetheless, despite the use of such specialized processing hardware, emerging machine learning techniques may tax existing processing systems due to the typically enormous volume of computations that such systems are often expected to perform.

SUMMARY

As will be described in greater detail below, the instant disclosure describes mixed-precision processing elements, systems, and methods for computational models. In one example, a method may include (1) receiving a precision level of each weight associated with each input of a node of a computational model, (2) identifying, for each weight, one of a plurality of multiplier groups, where each multiplier group may include a plurality of hardware multipliers of a corresponding bit width, and where the corresponding bit width of the plurality of hardware multipliers of the one of the plurality of multiplier groups is sufficient to multiply the weight by the associated input based on the precision level of the weight, and (3) multiplying each weight by its associated input using an available hardware multiplier of the one of the plurality of multiplier groups identified for the weight.

In some embodiments, receiving the precision level of the weight associated with each input may include receiving, for each weight, a sideband signal indicating the precision level of the weight. In some examples, the method may further include (1) quantizing the weight associated with each input of the node, and (2) detecting, after the quantizing of the weight associated with each input, the precision level of the weight associated with each input. The weights, in some embodiments, may range from a maximum negative integer to a maximum positive integer. In some examples, identifying one of the plurality of multiplier groups for each weight may include determining that a multiplying operation is not to be performed for a particular weight and an associated input based on the particular weight being zero.

In some examples, the one of the plurality of multiplier groups for each weight may include the multiplier group corresponding to the smallest corresponding bit width sufficient to multiply the weight by the associated input. In some other embodiments, identifying the one of the plurality of multiplier groups for each weight may include determining, for one of the weights, that the multiplier group corresponding to the smallest corresponding bit width sufficient to multiply the weight by the associated input has no hardware multipliers currently available, and the corresponding bit width of the plurality of hardware multipliers of the one of the plurality of multiplier groups may be the next smallest available bit width. In at least some examples, identifying one of the plurality of multiplier groups for each weight may facilitate the multiplying of the weights and the associated inputs of the node in parallel.

In at least some embodiments, each hardware multiplier of a first multiplier group may be an n-by-n hardware multiplier, and each hardware multiplier of a second multiplier group may be an m-by-n hardware multiplier, where n is a maximum number of significant bits of the weights of the node, and m is less than n. In some cases, m and n may be different powers of two. In some examples, multiplying each weight of the node by its associated input may be performed within a single hardware processing cycle.

In some embodiments, the method may further include adding together the products of multiplying each weight of the node by its associated input. In addition, the method may include (1) applying an activation function to the sum of the products of multiplying each weight of the node by its associated input, and (2) forwarding the result of the activation function as an input for at least one other node of the computational model.

In some examples, a first number of hardware multipliers in a first multiplier group may be of a first corresponding bit width, and a second number of hardware multipliers in a second multiplier group may be of a second corresponding bit width, where the first number is less than the second number and the first corresponding bit width is greater than the second corresponding bit width.

In one example, a processing element may include (1) a plurality of multiplier groups, where each multiplier group may include a plurality of hardware multipliers of a corresponding bit width, and (2) a multiplier group identification unit that receives a precision level of each weight associated with each input of a node of a computational model, and identifies, for each weight, one of the plurality of multiplier groups, where the corresponding bit width of the plurality of hardware multipliers of the one of the plurality of multiplier groups is sufficient to multiply the weight by the associated input based on the precision level of the weight. Each weight may be multiplied by its associated input using an available hardware multiplier of the one of the plurality of multiplier groups identified for the weight.

In some embodiments, the multiplier group identification unit may receive a sideband signal indicating the precision level of the weight associated with each input of the node. In other examples, the processing element may include a precision level determination unit that receives the weight associated with each input of the node, quantizes the weight associated with each input of the node, and detects the precision level of the weight associated with each input after quantizing the weight associated with each input.

In some examples, the processing element may further include a hardware accumulator that sums products provided by the hardware multipliers of the processing element.

Also, in some embodiments, the one of the plurality of multiplier groups for each weight may include the multiplier group corresponding to the smallest corresponding bit width sufficient to multiply the weight by the associated input.

In one example, a system may include a plurality of hardware processing elements that operate as nodes of a computational model. At least one of these hardware processing elements may include (1) a plurality of multiplier groups, where each multiplier group comprises a plurality of hardware multipliers of a corresponding bit width, and (2) a multiplier group identification unit that receives a precision level of each weight associated with each input of a node of the computational model, and identifies, for each weight, one of the plurality of multiplier groups, where the corresponding bit width of the plurality of hardware multipliers of the one of the plurality of multiplier groups is sufficient to multiply the weight by the associated input based on the precision level of the weight. Each weight may be multiplied by its associated input using an available hardware multiplier of the one of the plurality of multiplier groups identified for the weight.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
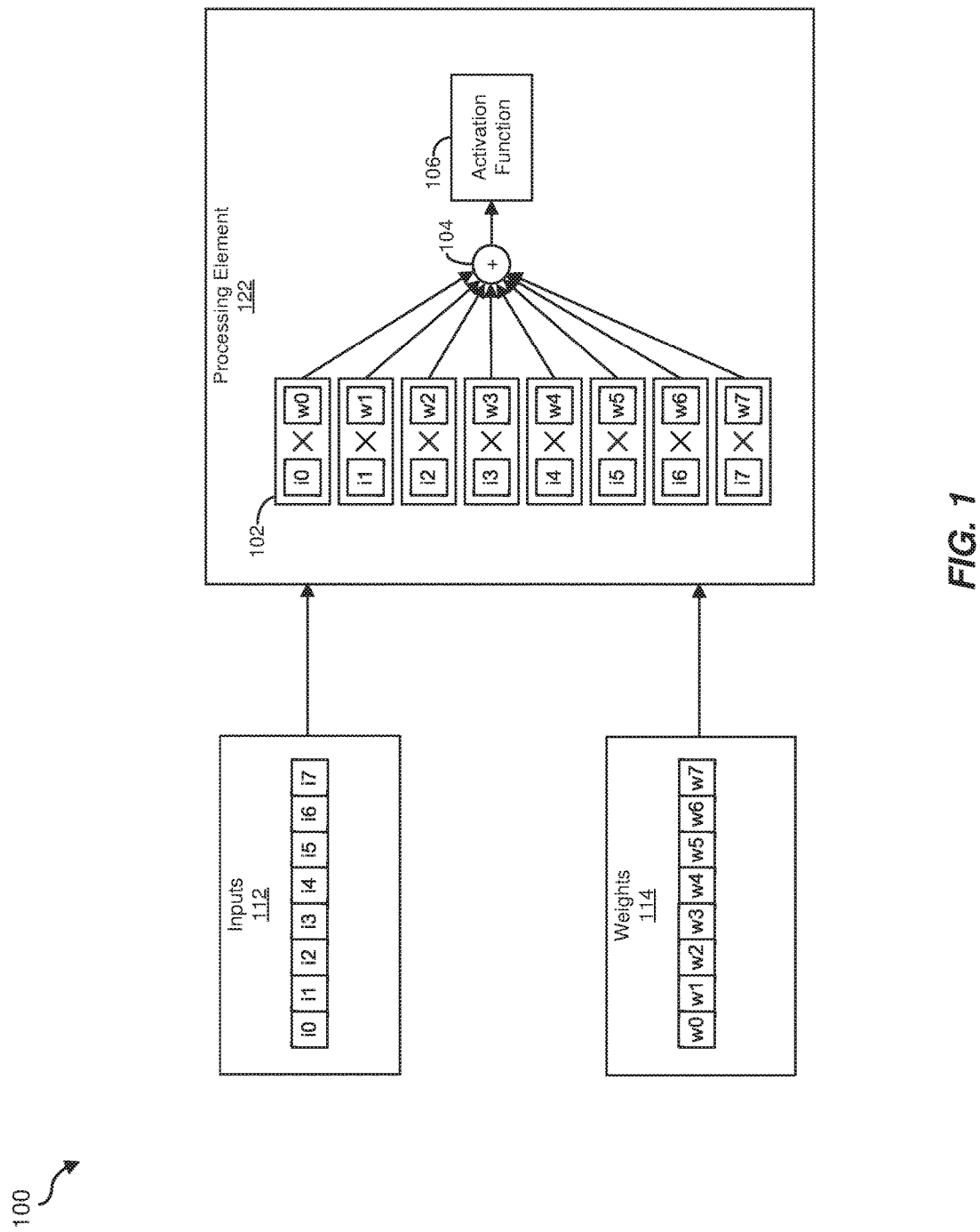
FIG. 1 is a dataflow diagram of operations executed by an exemplary subsystem including a processing element with associated inputs and weights for a computational model.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to mixed-precision processing elements, systems, and methods for computational models. As will be explained in greater detail below, embodiments of the instant disclosure may provide mixed-precision processing elements, in which multipliers of different sizes (e.g., different bit widths for at least one weight or associated input of one or more nodes of the model) may be available to perform the multiplication operations that a processing element typically executes. Consequently, in some examples, more multipliers may be placed within the same physical footprint of a processing element compared to processing elements in which all multipliers are of some maximum size capable of handling the maximum possible precision level (e.g., the number of significant bits) of each weight and associated input of a node. This lower footprint may facilitate one or more other advantages, such as an increased number of possible processing elements, higher processing speeds, and lower power consumption.

Figure 2:
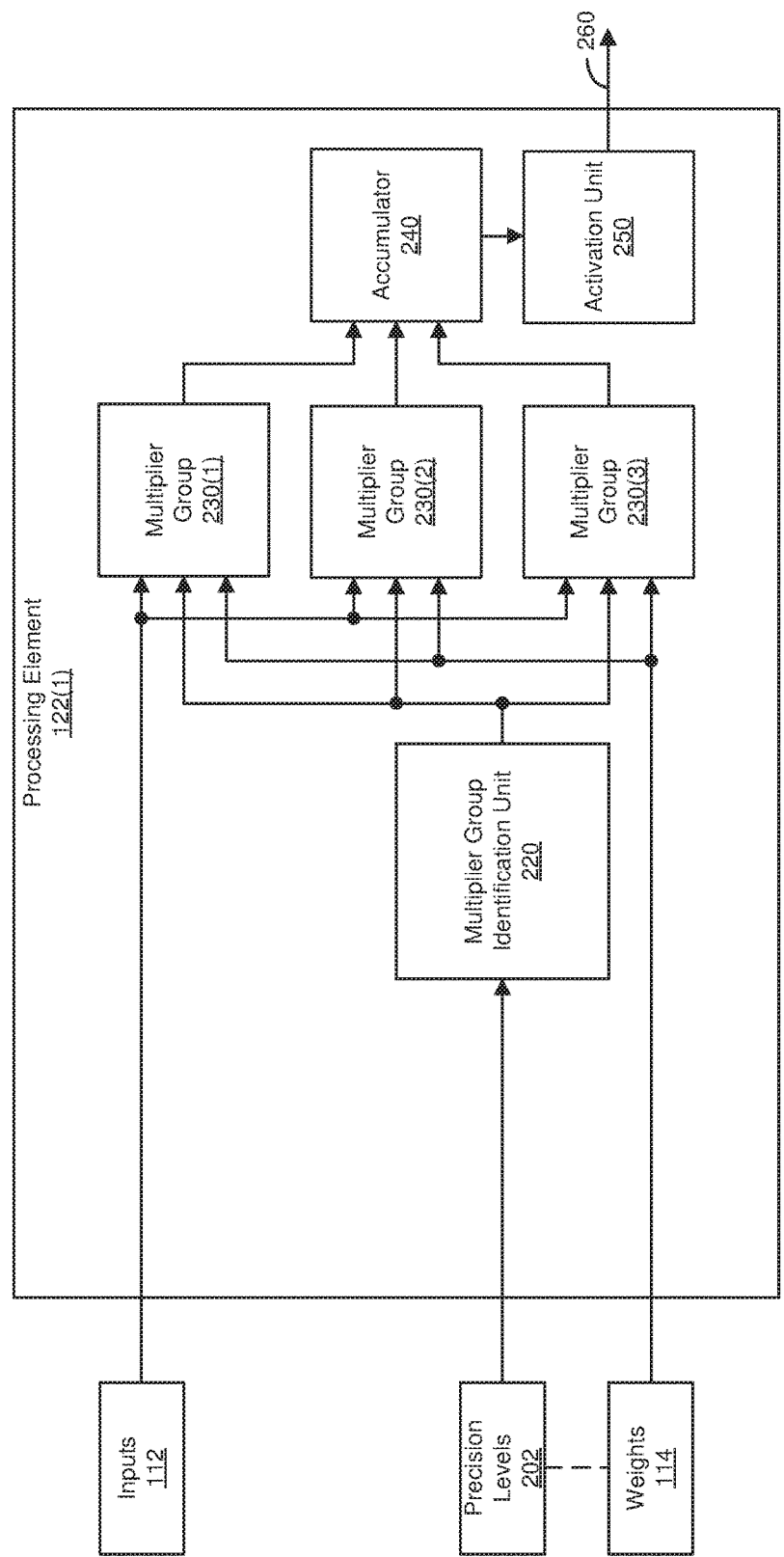
FIG. 2 is a block diagram of an exemplary mixed-precision processing element employing a plurality of multiplier groups.
Figure 3:
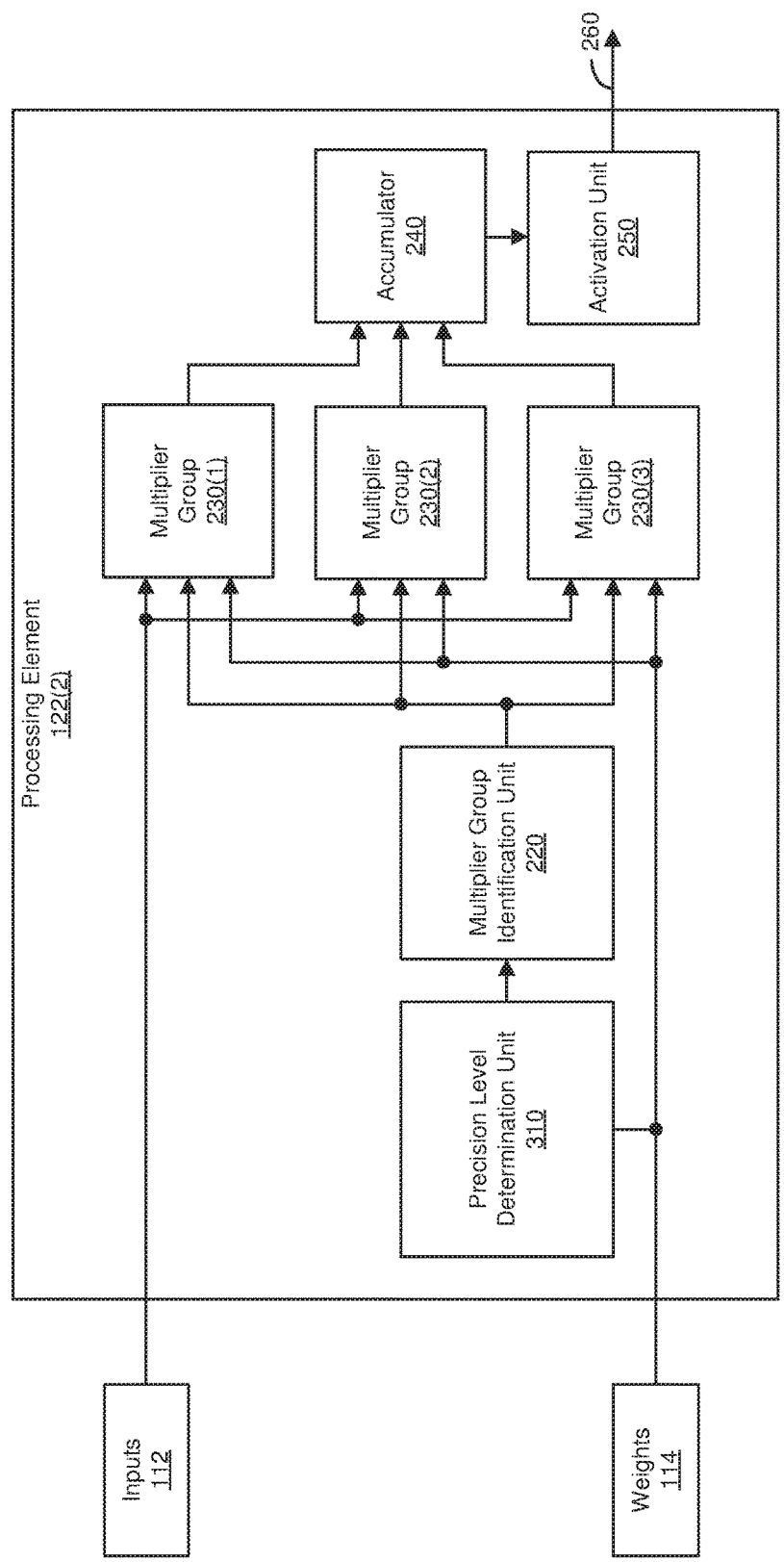
FIG. 3 is a block diagram of another exemplary mixed-precision processing element employing a plurality of multiplier groups.
Figure 4:
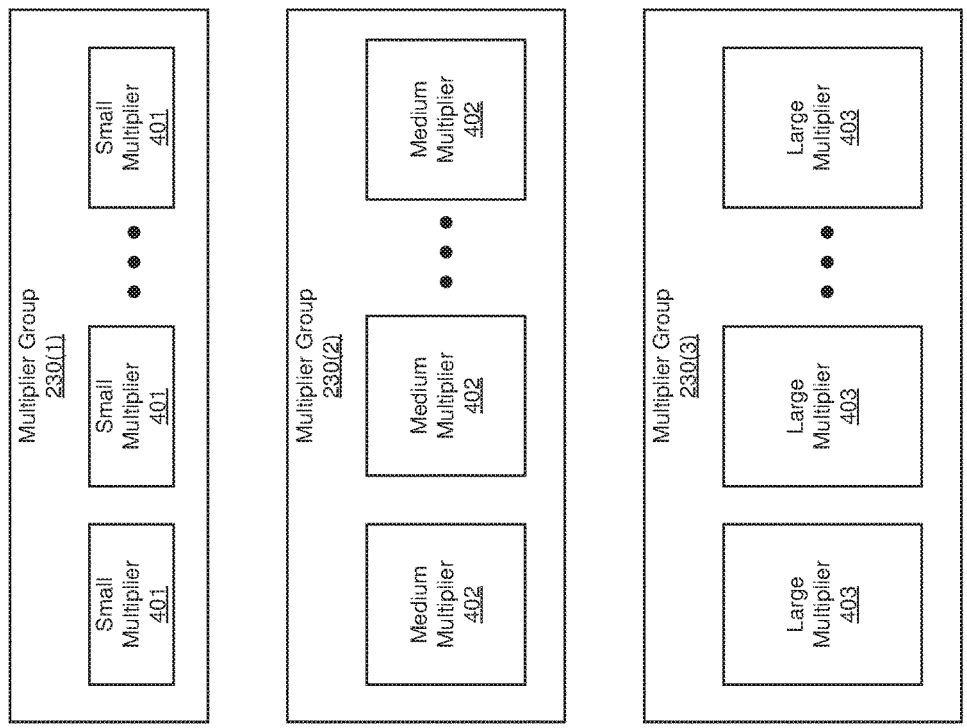
FIG. 4 is a block diagram of exemplary multiplier groups employable in the mixed-precision processing elements of FIGS. 2 and 3.
Figure 6:
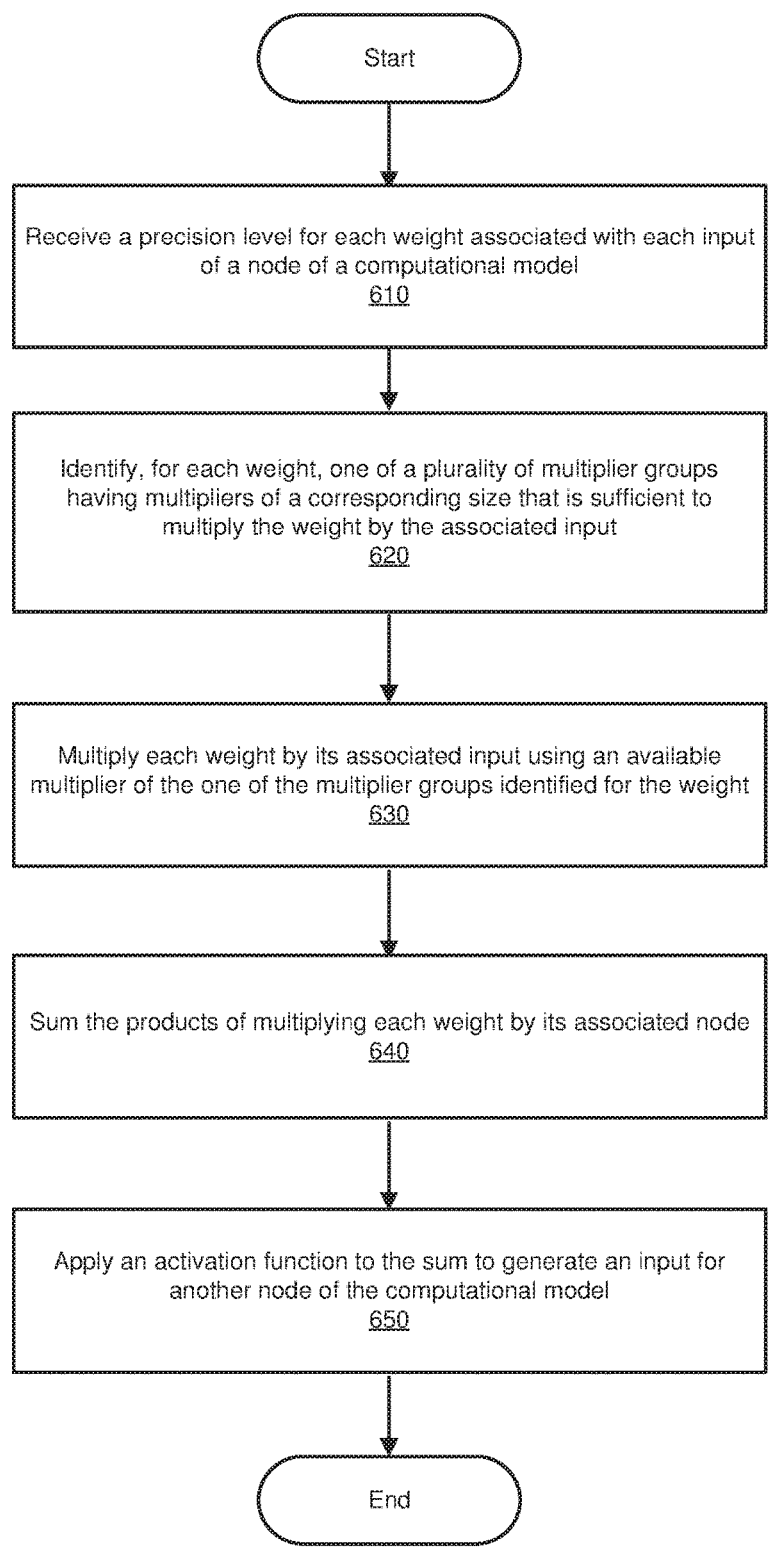
FIG. 6 is a flow diagram of an exemplary method for operating a mixed-precision processing element in a computational model.
Figure 7:
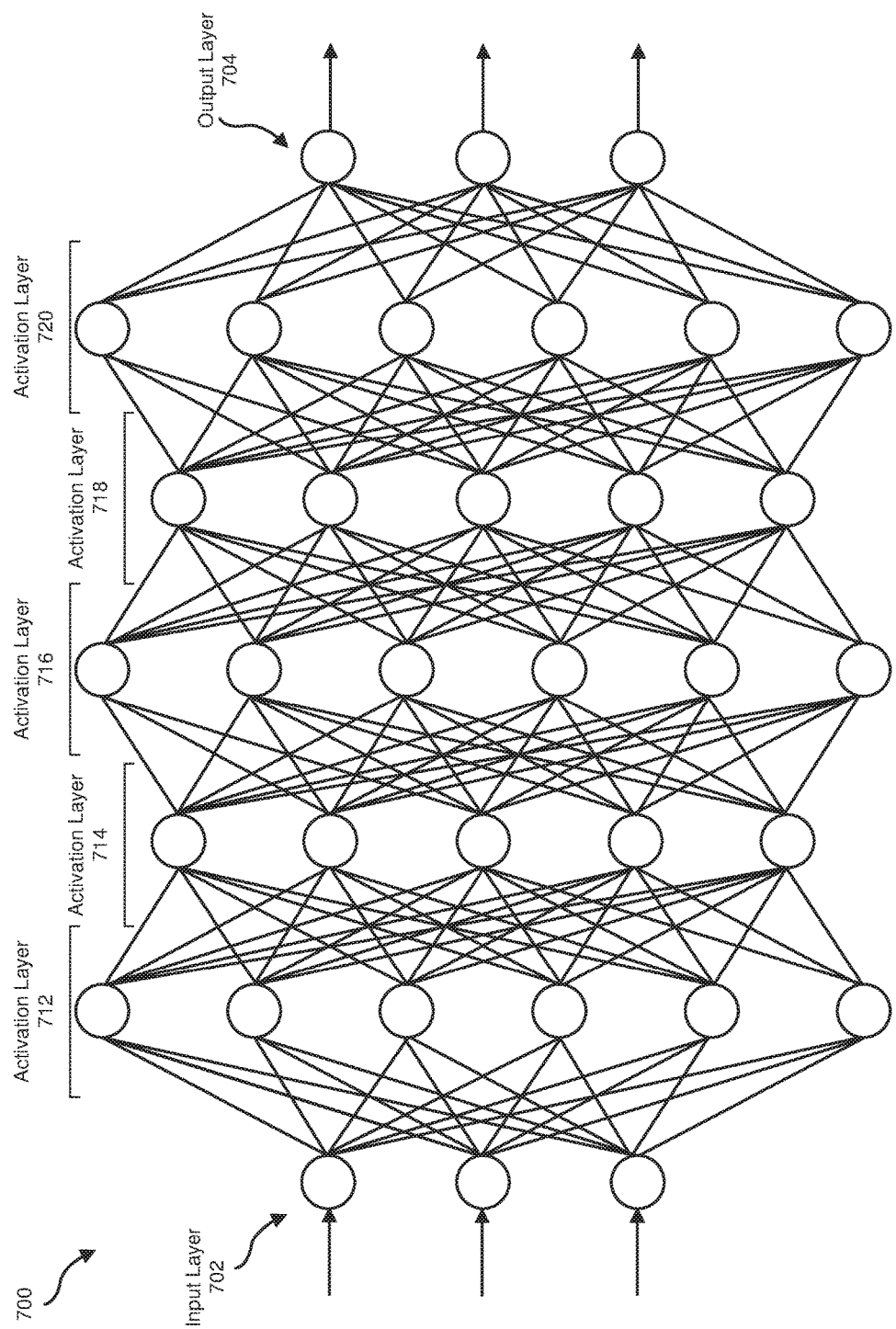
FIG. 7 is a diagram of nodes within an exemplary neural network in which mixed-precision processing may be performed.
Figure 8:
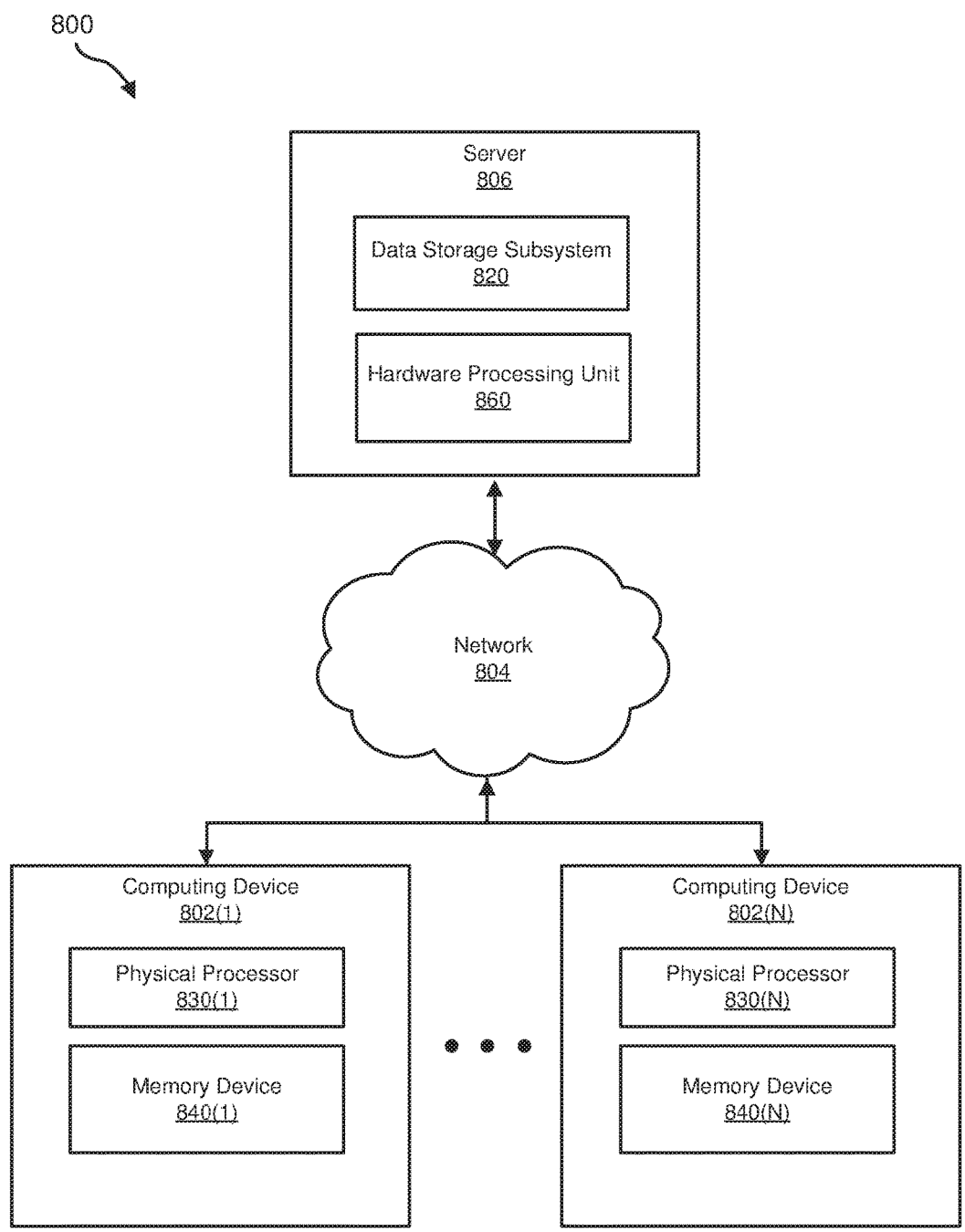
FIG. 8 is a block diagram of an exemplary system in which mixed-precision processing elements may be included.

The following will provide, with reference to FIGS. 1-9, detailed descriptions of mixed-precision processing elements, systems, and methods for computational models. Multiply-accumulate (or dot-product) operations typically expected of a subsystem including a processing element are discussed below in conjunction with FIG. 1. Descriptions of various embodiments of mixed-precision processing elements are provided in connection with FIGS. 2 and 3. Aspects of exemplary multiplier groups, as depicted in FIG. 4, that are employable in the mixed-precision processing elements of FIGS. 2 and/or 3 are also presented hereinafter. An exemplary hardware accelerator employing multiple mixed-precision processing elements is discussed below in conjunction with FIG. 5. A discussion of an exemplary method of operating a mixed-precision processing element in a computational model is provided in association with FIG. 6. The following also provides, with reference to FIG. 7, a discussion of exemplary neural networks that may leverage mixed-precision processing elements. The description of FIG. 8 is directed to an exemplary system in which mixed-precision processing elements may be implemented. Also, with reference to FIG. 9, the following disclosure presents an example of a computing system in which the mixed-precision processing elements of FIGS. 2 and/or 3 may be installed.

FIG. 1 is a dataflow diagram illustrating operations executed by a subsystem 100 for a node of a computational model that receives multiple inputs 112 and associated mathematical weights 114 provided to a mixed-precision processing element 122 for processing. In some examples described in greater detail herein, the computation model may be an artificial neural network (ANN), or more colloquially, a neural network. However, other types of computational models in which a large number of computational resources, such as processing elements 122, are employed to analyze a complex set of inputs (e.g., visual inputs, audio inputs, and so on) may benefit from use of processing elements 122 in other embodiments. Moreover, such computational models may include other types of machine learning systems and other forms of artificial intelligence, as well other types of systems not associated with artificial intelligence.

In the example of FIG. 1, for a particular node of the computational model, each of eight inputs 112 (e.g., i0, i1, i2, i3, i4, i5, i6, and i7) may be associated with a corresponding weight 114 (e.g., w0, w1, w2, w3, w4, w5, w6, and w7). While eight inputs 112 and associated weights 114 are discussed in this particular example, any number of inputs 112 and corresponding weights 114 may be used in other examples, and such numbers may vary from node to node in the computational model.

As shown in FIG. 1, processing element 122 may perform a multiplication function 102 on each input-weight pair (e.g., i0×w0, i1×w1, i2×w2, and so on) and accumulate (e.g., sum) or otherwise combine the resulting products of multiplication functions 102 by way of an accumulate function 104. In some examples, processing element 122 may employ the resulting sum from accumulate operation 104 as input to an activation function 106. Examples of activation functions include, but are not limited to, Rectified Linear Unit (ReLU), Softsign, Inverse Square Root Unit (ISRU), and so on. In other examples, processing element 122 may not include an activation function. Also, in some examples, a function or operation other than accumulate function 104 may be employed in conjunction with multiplication functions 102 in some computational models.

In some embodiments, one or both of inputs 112 and weights 114 may each represent a vector, such as a row or column of a two-dimensional matrix (or portions thereof). As a result, multiplication functions 102 and accumulate function 104 may be employed as vector-vector (or more broadly, matrix-matrix) computations, such as dot-product operations that may be employed for image recognition and other high-complexity tasks.

The term "dot product," in some examples, may generally refer to any algebraic operation that processes two sequences of numbers and returns a single number. In other words, a dot product may be a sum of the products of corresponding entries of two different number sequences or vectors. Alternatively, while the dot-product calculations discussed herein are presented primarily in algebraic terms, a dot product may also be described geometrically in terms of angle and distance (i.e., in terms of the magnitude of vectors). In some contexts, a dot product may be referred to as a scalar product or an inner product. In some embodiments, dot-product operations may also be performed in the context of three-dimensional matrices and/or one-dimensional matrices (e.g., individual vectors).

In performing multiplication functions 102, processing element 122, in some examples described in greater detail below, employs hardware multipliers of varying sizes to facilitate performing at least some multiplication functions 102 in parallel while not mandating that all of the multipliers be capable of performing multiplication functions 102 in which a weight 114 and associated input 112 possess a maximum possible bit width, thus potentially reducing the footprint, power consumption, and/or execution time of processing element 122.

FIGS. 2 and 3 depict exemplary mixed-precision processing elements 122. In both FIG. 2 and FIG. 3, processing element 122 includes several multiplier groups 230, where each multiplier group 230 may include one or more multipliers of a particular size (e.g., bit width for input 112 and/or weight 114), and where the multiplier sizes of each multiplier group 230 are different than those of another multiplier group. While FIGS. 2 and 3 explicitly illustrate three multiplier groups 230, two or more multiplier groups 230 may be employed in other examples.

In FIG. 2, processing element 122(1) includes a plurality of multiplier groups 230 (e.g., multiplier groups 230(1), 230(2), and 230(3)) that may receive inputs 112 and weights 114 to be multiplied, as described above. In addition, processing element 122(1) may include an accumulator 240 that sums or otherwise combines (e.g., employing accumulate function 104) the products of each multiplier in multiplier groups 230 that is employed to multiply one of inputs 112 with its corresponding weight 114. Processing element 122(1) may also include an activation unit 250 that applies an activation function (e.g., activation function 106) to the sum or other accumulated result from accumulator 240 to produce an output 260 for processing element 122(1).

Additionally, processing element 122(1) may include a multiplier group identification unit 220 that identifies a multiplier group 230 to which each input-weight pair is presented for multiplying. In at least some embodiments, multiplier group identification unit 220 may identify the particular multiplier group 230 based on information indicating precision levels 202 (e.g., a number of significant bits, or a bit width) for weights 114. For example, multiplier group identification unit 220 may receive one or more sideband signals for each weight 114 indicating the number of significant bits of that weight 114. The sideband signals, for example, may provide an encoded signal for each weight 114 directly indicating the number of significant bits. Presuming, for example, that weights 114 may be whole numbers in the range of zero to 255, the sideband signals for a particular weight 114 may indicate zero significant bits for a weight 114 of zero (e.g., indicating that a multiplication of weight 114 with its corresponding input 112 is not necessary), one significant bit for a weight 114 of one, two significant bits for a weight 114 of two or three, three significant bits for a weight 114 of four through seven, four significant bits for a weight 114 of eight through fifteen, and so on, up to eight significant bits for a weight 114 of 128 to 255.

In other embodiments, weights 114 may be either positive or negative integers in a range centered about zero. In such embodiments, fewer significant bits overall may be needed to facilitate multiplication of each weight 114 with a corresponding input 112. Presuming, for example, weights 114 may be integers in the range of −127 to 127 (e.g., in sign-and-magnitude representation), the sideband signals for a particular weight 114 may indicate zero significant bits for a weight 114 of zero (e.g., indicating that a multiplication of weight 114 with its corresponding input 112 is not necessary), one significant bit for a weight 114 of 1 or −1, two significant bits for a weight 114 of 2, 3, −2, or −3, three significant bits for a weight 114 of 4 through 7 or −4 through −7, and so on. In this example, the sign of the integer may not be included as a significant bit because the sign bit may be considered separately from the actual multiplication operation performed by a hardware multiplier in one of the multiplier groups 230 and employed to determine the sign of the product.

While sideband signals may be provided to multiplier group identification unit 220 to indicate precision level 202 (e.g., bit width) of each weight 114, other types of metadata may be provided to indicate precision levels 202 in other embodiments. Also in some examples, weights 114 may be compressed (e.g., using quantization) prior to being presented to processing element 122(1) to reduce the maximum precision level 202 (e.g., maximum bit width of weights 114). For example, by quantizing or "binning" weights 114 that represent high precision levels 202 (e.g., weights 114 that span a wide range of integers, weights 114 that include fractions, or the like) to map weights 114 into fewer possible values, the overall precision level 202 of weights 114 may be decreased, resulting in lower bit widths for at least some weights 114 received at processing element 122(1).

In response to receiving the sideband signals, multiplier group identification unit 220 may identify a particular multiplier group 230 for each weight 114 such that the selected multiplier group 230 includes an available hardware multiplier (e.g., a multiplier not yet selected to perform a multiplication operation for another weight 114 and associated input 112) of sufficient size (e.g., of sufficient bit width for weight 114) to multiply the current weight 114 and associated input 112, based on precision level 202 (e.g., the bit width) of the current weight 114. For example, multiplier group identification unit 220 may identify multiplier group 230 for weight 114 of bit width n if multiplier group 230 includes a hardware multiplier of at least bit width n for weight 114. In some examples, multiplier group identification unit 220 may identify multiplier group 230 for weight 114 of bit width n if multiplier group 230 includes at least one available multiplier having the smallest bit width greater than or equal to n that is provided in processing element 122(1). Also, in some embodiments, if no hardware multipliers are currently available in multiplier group 230 that includes at least one multiplier having the smallest bit width greater than or equal to n, multiplier group identification unit 220 may identify multiplier group 230 having the next smallest bit width greater than or equal to n.

As indicated above, processing element 122(1) provides hardware multipliers of varying sizes (e.g., bit widths) organized according to multiplier groups 230. Consequently, if enough high-bit-width weights 114 are received simultaneously at processing element 122(1), processing element 122(1) may not include enough multipliers of sufficient size to perform all necessary multiplication operations for weights 114 and associated inputs 112 during the same processing cycle. As a result, processing element 122(1) may delay the multiplication operation for one or more weights and associated inputs 112 until multipliers of sufficient size become available. While providing all multipliers of a maximum possible bit width in processing element 122(1) would circumvent such an event, providing multipliers of varying sizes, as described herein, may provide overall faster processing speed, as well as reduced circuit footprint and power consumption, for processing element 122(1).

While embodiments discussed herein focus on selecting multiplier groups 230 based on precision levels 202 (e.g., bit widths) of weights 114, the precision levels of inputs 112, alternatively or additionally, may be employed to select multiplier groups 230 for particular multiplication operations in other examples.

While FIG. 2 describes an embodiment in which precision levels 202 are generated externally to processing element 122(1) (e.g., as a result of quantizing or otherwise compressing weights 114), FIG. 3 illustrates a processing element 122(2) that, in addition to multiplier group identification unit 220, multiplier groups 230, accumulator 240, and activation unit 250, may include a precision level determination unit 310 that provides precision level information similar to precision levels 202, as depicted in FIG. 2. In some examples, precision level determination unit 310 may determine a value of each bit of each weight 114 to determine the precision level (e.g., bit width, or number of significant bits) of each weight 114. In other embodiments, precision level determination unit 310 may also compress (e.g., quantize) weights 114, as discussed above, as weights 114 are received at processing element 122(2). The various components of processing element 122(2) that are included in processing 122(1), in at least some examples, may operate as described above.

FIG. 4 provides representations of multiplier groups 230 (e.g., multiplier groups 230(1), 230(2), and 230(3) of FIGS. 2 and 3). More specifically, multiplier group 230(1) includes a number of small multipliers 401, multiplier group 230(2) includes a number of medium multipliers 402, and multiplier group 230(3) includes a number of large multipliers 403. In some examples, the relative terms "small," "medium," and "large" represent relative multiplier sizes (e.g., bit widths) associated with the hardware multipliers 401, 402, and 403 of each corresponding multiplier group 230. In one example, large multipliers 403 may be n-by-n multipliers (e.g., n-bit-by-n-bit multipliers), where n is the maximum number of significant bits of weights 114, as well as possibly greater than or equal to the maximum number of significant bits of inputs 112. In this example, medium multipliers 402 may be n-by-m multipliers, where m is less than n, and m is the maximum bit width for a weight 114 that may be processed by each medium multiplier 402. Continuing with this example, small multipliers 401 may be n-by-l multipliers, where l is less than m, and l is the maximum bit width for a weight 114 that may be processed by each small multiplier 401. In some embodiments, each of l, m, and n are powers of two. For example, n may be 8, m may be 4, and l may be 2, resulting in small multipliers 401 being 8-by-2 multipliers, medium multipliers 402 being 8-by-4 multipliers, and large multipliers 403 being 8-by-8 multipliers. In at least some embodiments, the 8-by-8 multipliers may be greater in footprint, power consumption, and execution time that either the 8-by-4 or 8-by-2 multipliers. In this example, inputs 112 are presumed to be a maximum of 8 bits in width, but may be wider or narrower in other examples. In other examples, the sizes or bit widths of small multipliers 401, medium multipliers 402, and large multipliers 403 may not be related according to powers of two, but as multiples of two (e.g., n may be 8, m may be 6, and l may be 4), or they may be related mathematically in other ways. For example, in some embodiments, n and/or m may be any positive integer, such as 3, 5, or the like. Also, n and m may be the same positive integer or different positive integers.

In some examples, the number of multipliers 401, 402, and 403 of each multiplier group 230 may be different. In one embodiment, each multiplier group 230 may include approximately a third of the total number of multipliers included in processing element 122. However, other distributions regarding the relative number of multipliers of each multiplier group 230 (e.g., 40 percent, 40 percent, and 20 percent) are possible in other embodiments. In another example, multiplier group 230(1) and/or multiplier group 230(2) may have a greater number of multipliers (e.g., small multipliers 401 and/or medium multipliers 402) than the number of large multipliers 403 in multiplier group 230(3). Moreover, as indicated above, while three multiplier groups 230 are depicted in FIGS. 2-4, other numbers of multiplier groups 230 may be used in other examples.

Various aspects regarding multiplier groups 230 in a particular processing element 122, such as, for example, the number of multiplier groups 230, the number of multipliers per multiplier group 230, the size (e.g., bit width) of the multipliers of each multiplier group 230, and the like, may be based on statistical data, prior experience, and other information related to other computational models, such as those performing the same or similar tasks (e.g., image recognition, natural language processing, and so on) to those assigned to the computational model in which processing elements 122 are to be employed.

Figure 5:
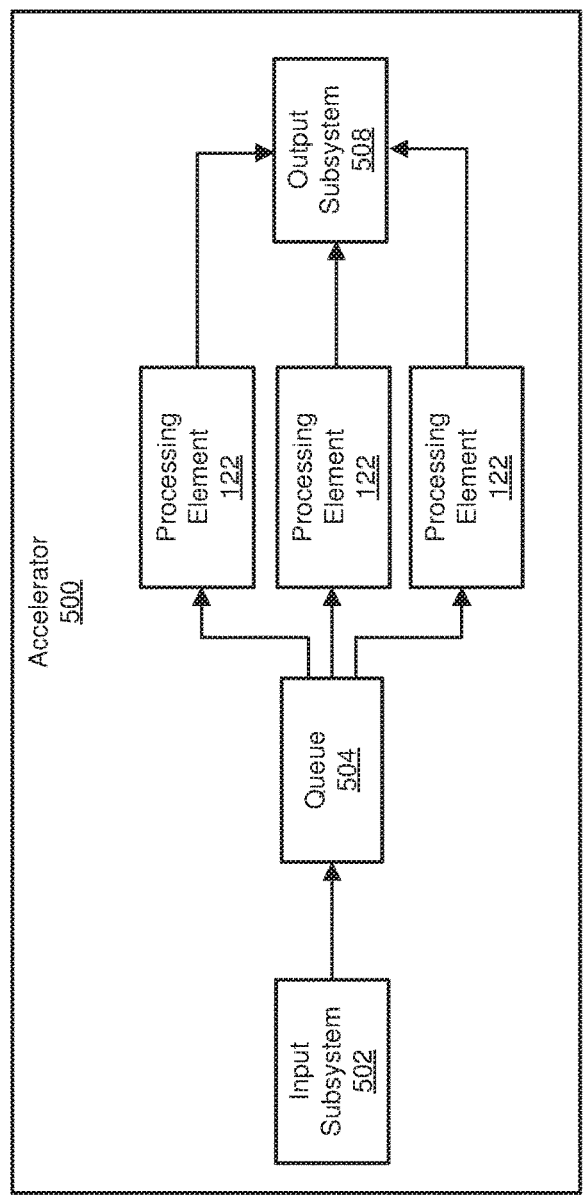
FIG. 5 is a block diagram of an exemplary hardware accelerator including multiple processing elements.

FIG. 5 illustrates a hardware accelerator 500 in which multiple processing elements 122 may be included to perform the various operations associated with the particular computational model to be employed. Accelerator 500 may include an input subsystem 502, at least one queue 504, multiple processing elements 122 (e.g., as shown in FIGS. 2 and 3), and/or an output subsystem 508.

Input subsystem 502 and output subsystem 508 may generally represent one or more circuits, controllers, interfaces, busses, and/or other devices or systems for sending and/or receiving and/or processing data (e.g., inputs 112 and weights 114 of FIGS. 1-3) at accelerator 500. For example, in examples where accelerator 500 is installed in a computing system, input subsystem 502 may connect to a communication infrastructure to enable accelerator 500 to interact with other components of the computing system. An example of such a computing system is presented below in conjunction with FIG. 9. While shown as separate subsystems, input subsystem 502 and output subsystem 508 may be implemented as a single input/output (I/O) system.

Queue 504 may receive and queue data from input subsystem 502, and subsequently forward that data to processing elements 122 depending on the availability of each processing element 122. In some examples, queue 504 may provide all data for a particular node of a computational model to a currently idle processing element 122. While three processing elements 122 are depicted in FIG. 5, other examples may include more (e.g., tens, hundreds, or thousands) of processing elements 122.

FIG. 6 is a flow diagram of an exemplary method 600 for operating a mixed-precision processing element (e.g., processing element 122 of FIGS. 1-3). In some embodiments, the steps shown for method 600 in FIG. 6 may be performed by processing elements 122 of a hardware accelerator (e.g., hardware accelerator 500 of FIG. 5), as described above. In some embodiments, at least some portions of method 600 may be performed by any suitable computer-executable code and/or computing system, including the system(s) illustrated in FIGS. 1-5 and 7-9. In one example, each of the steps shown in FIG. 6 may represent an algorithm whose structure includes and/or is represented by multiple sub-steps, examples of which will be provided in greater detail below.

At step 610, a precision level (e.g., a bit width or a number of significant bits, such as precision level 202 of FIG. 2) may be received for each weight (e.g., weight 114 of FIGS. 1-3) of a node of a computational model. At step 620, based on the received precision levels, one of a plurality of multiplier groups (e.g., multiplier groups 230 of FIGS. 2 and 3) may be identified for each weight. In some examples, as discussed above, for a particular weight, the multiplier group with an available multiplier (e.g., multiplier 401, 402, or 403 of FIG. 4) having the smallest bit width capable of multiplying the weight by its associated input (e.g., input 112 of FIGS. 1-3) may be selected. At step 630, each weight may be multiplied by its associated input using an available multiplier of the one of the multiplier groups identified for the weight. At step 640, the products of the multiplication operations (e.g., the product of each weight 114 and its corresponding input 112) may be summed or otherwise accumulated (e.g., using accumulator 240 of FIGS. 2 and 3). Also, in some examples, at step 650, an activation function (e.g., using activation unit 250 of FIGS. 2 and 3) may be applied to generate an input for another node of the computation model.

As detailed above, various embodiments of a mixed-precision processing element may include multiple hardware multipliers of varying size (e.g., bit width) to perform the multiplication portions of a multiply-accumulate or dot-product operation employed in some computational models. Since many computational models do not involve a maximum bit width for each input and/or weight to be multiplied, at least some hardware multipliers may be of a smaller-than-maximum bit width. Accordingly, a mixed-precision processing element, as described above, may allow some combination of potential advantages. For example, since smaller-bit-width multipliers occupy a smaller footprint, consume less power, and/or execute more quickly than their larger counterparts, more multipliers may be employed in a processing element, more processing elements may be implemented within an accelerator, overall multiply-accumulate operations may be performed more quickly, and so on.

The processing elements 122, possibly as implemented with hardware accelerator 500, as detailed above, may enable computing systems to realize the above-described benefits across a wide variety of computing tasks and workloads, including machine learning. FIG. 7 is a block diagram of an exemplary feed-forward neural network 700 capable of benefiting from one or more of the embodiments described herein. Neural network 700 may include an input layer 702, an output layer 704, and a series of five activation layers—activation layer 712, activation layer 714, activation layer 716, activation layer 718, and activation layer 720. While FIG. 7 provides an example with five activation layers, neural network 700 may include any other suitable number of activation layers (e.g., one activation layer, dozens of activation layers, thousands of activation layers, etc.).

In the example shown in FIG. 7, data flows from input layer 702 through activation layers 712-720 to output layer 704 (i.e., from left to right). As shown, each value from the nodes of input layer 702 may be duplicated and sent to the nodes of activation layer 712. At activation layer 712, a set of weights (e.g., a filter) may be applied to the layer inputs, and each node may output a weighted sum to activation layer 714. This process may be repeated at each activation layer in sequence to create outputs at output layer 704.

FIG. 8 illustrates an exemplary network environment 800 (such as a social network environment) in which aspects of the present disclosure may be implemented. As shown, network environment 800 may include a plurality of computing devices 802(1)-(N), a network 804, and a server 806. In one example, server 806 may host a social network or may be part of a system that hosts a social network. In this example, server 806 may include one or more of the hardware accelerators described herein, such as hardware accelerator 500 of FIG. 5.

Computing devices 802(1)-(N) may each represent a client device or a user device, such a desktop computer, laptop computer, tablet device, smartphone, or other computing device. Each of computing devices 802(1)-(N) may include a physical processor (e.g., physical processors 830(1)-(N)), which may represent a single processor or multiple processors, and a memory device (e.g., memory devices 840(1)-(N)), which may store instructions (e.g., software applications) or data.

Computing devices 802(1)-(N) may be communicatively coupled to server 806 through network 804. Network 804 may be any communication network, such as the Internet, a Wide Area Network (WAN), or a Local Area Network (LAN), and may include various types of communication protocols and physical connections.

As noted, server 806 may host a social network, and in such embodiments, computing devices 802(1)-(N) may each represent an access point (e.g., an end-user device) for the social network. In some examples, a social network may refer to any type or form of service that enables users to connect through a network, such as the Internet. Social networks may enable users to share various types of content, including web pages or links, user-generated content such as photos, videos, posts, and/or to make comments or message each other through the social network.

In some embodiments, server 806 may access data (e.g., data provided by computing devices 802(1)-(N)) for analysis. For example, server 806 may perform (using, e.g., hardware accelerator 500) various types of AI or machine-learning tasks on data. For instance, server 806 may use AI or machine-learning algorithms to rank feeds and search results, to identify spam, pornography, and/or other misleading content, to perform speech recognition (e.g., to automatically caption videos), to automate translation from one language to another, to enable natural language processing, to enable computer vision (e.g., to identify objects in images, to turn panoramic photos into interactive 360-degree images, etc.), and/or to perform a variety of other tasks. In one example, by incorporating one or more of the hardware accelerators described herein (e.g., hardware accelerator 500), server 806 may, when performing such tasks, realize the performance benefits and/or energy savings detailed above.

Embodiments of the instant disclosure may also be applied to various environments in addition to or instead of social networking environments. For example, the systems and methods disclosed herein may be used in video game development and game play (e.g., in reinforcement-learning techniques), to automate robotics tasks (e.g., grasping, stabilization, navigation, etc.), in medical research (e.g., genomics, cancer research, etc.), for autonomous vehicle navigation, and/or in any other suitable context.

In addition to being applied in a variety of technical fields, embodiments of the instant disclosure may also be applied to numerous different types of neural networks. For example, the systems and methods described herein may be implemented in any AI scheme that is designed to provide brain-like functionality via artificial neurons. In some examples (e.g., recurrent neural networks and/or feed-forward neural networks), these artificial neurons may be non-linear functions of a weighted sum of inputs that are arranged in layers, with the outputs of one layer becoming the inputs of a subsequent layer. In addition, while some of the examples herein are discussed in the context of AI hardware accelerators, aspects of the present disclosure may also be applied to other hardware processing systems in which convolution operations are required or useful.

Figure 9:
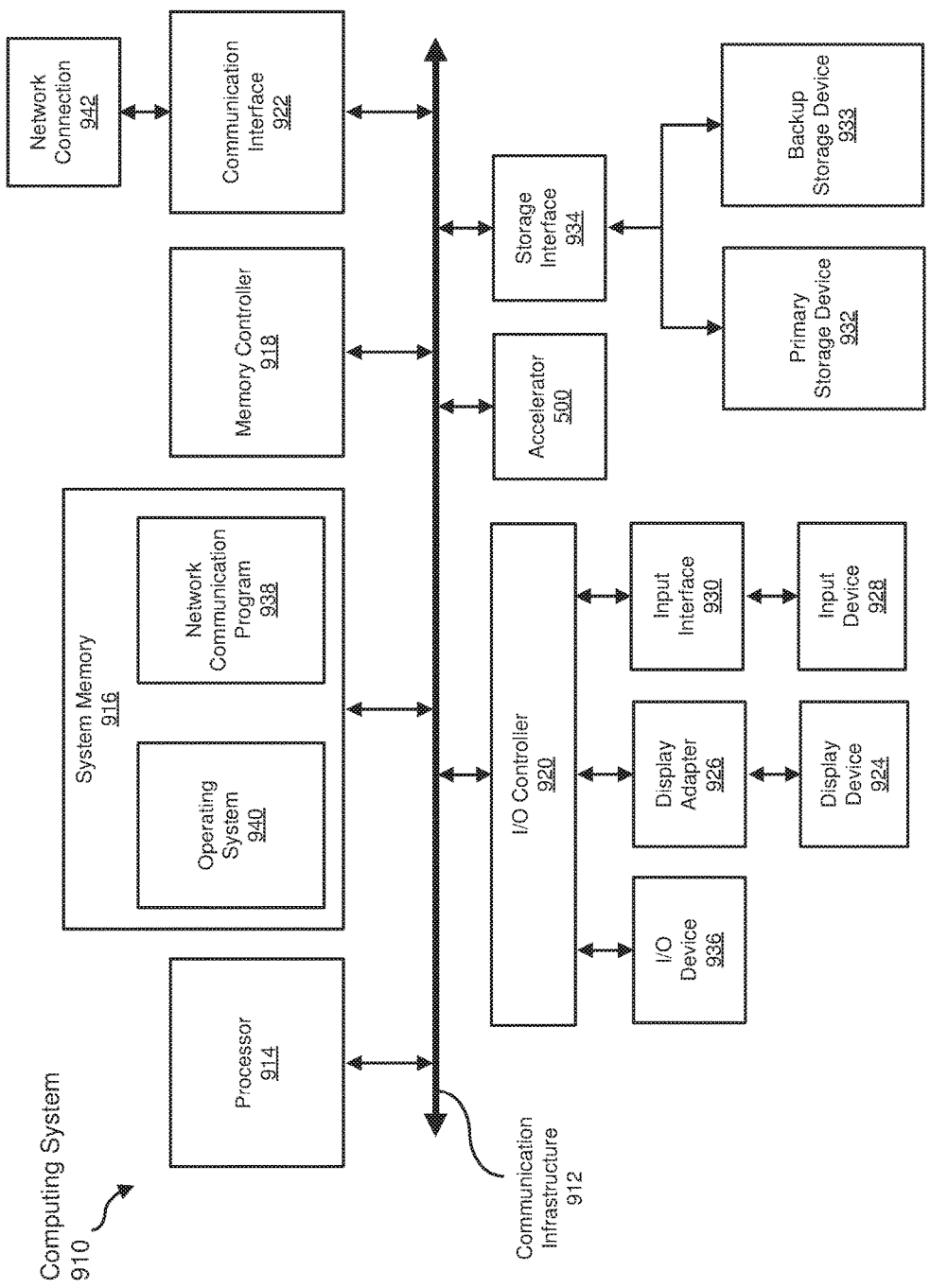
FIG. 9 is a block diagram of an exemplary computing system capable of implementing one or more of the embodiments described and/or illustrated herein.

As detailed above, the computing devices and systems described and/or illustrated herein broadly represent any type or form of computing device or system capable of executing computer-readable instructions. FIG. 9 is a block diagram of an exemplary computing system 910 capable of incorporating and/or implementing one or more of the embodiments described and/or illustrated herein. Computing system 910 broadly represents any single processor or multiprocessor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914, a system memory 916, and one or more of the hardware accelerators described herein, such as hardware accelerator 500.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments, computing system 910 may include both a volatile memory unit (such as, for example, system memory 916) and a non-volatile storage device (such as, for example, primary storage device 932, as described in detail below).

In some examples, system memory 916 may store and/or load an operating system 940 for execution by processor 914. In one example, operating system 940 may include and/or represent software that manages computer hardware and software resources and/or provides common services to computer programs and/or applications on computing system 910.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments, memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments, I/O controller 920 may control or facilitate transfer of data between one or more elements of computing system 910, such as processor 914, system memory 916, communication interface 922, display adapter 926, input interface 930, and storage interface 934.

As illustrated in FIG. 9, computing system 910 may also include at least one display device 924 coupled to I/O controller 920 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to I/O controller 920 via an input interface 930. Input device 928 generally represents any type or form of input device capable of providing input, either computer or human generated, to exemplary computing system 910. Examples of input device 928 include, without limitation, a keyboard, a pointing device, a speech recognition device, variations or combinations of one or more of the same, and/or any other input device.

Additionally or alternatively, exemplary computing system 910 may include additional I/O devices. For example, exemplary computing system 910 may include I/O device 936. In this example, I/O device 936 may include and/or represent a user interface that facilitates human interaction with computing system 910. Examples of I/O device 936 include, without limitation, a computer mouse, a keyboard, a monitor, a printer, a modem, a camera, a scanner, a microphone, a touchscreen device, variations or combinations of one or more of the same, and/or any other I/O device.

Communication interface 922 broadly represents any type or form of communication device or adapter capable of facilitating communication between exemplary computing system 910 and one or more additional devices. For example, in certain embodiments, communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

In some examples, system memory 916 may store and/or load a network communication program 938 for execution by processor 914. In one example, network communication program 938 may include and/or represent software that enables computing system 910 to establish a network connection 942 with another computing system (not illustrated in FIG. 9) and/or communicate with the other computing system by way of communication interface 922. In this example, network communication program 938 may direct the flow of outgoing traffic that is sent to the other computing system via network connection 942. Additionally or alternatively, network communication program 938 may direct the processing of incoming traffic that is received from the other computing system via network connection 942 in connection with processor 914.

Although not illustrated in this way in FIG. 9, network communication program 938 may alternatively be stored and/or loaded in communication interface 922. For example, network communication program 938 may include and/or represent at least a portion of software and/or firmware that is executed by a processor and/or application-specific integrated circuit (ASIC) incorporated in communication interface 922.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an ASIC adapted to implement one or more of the exemplary embodiments disclosed herein.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, CPUs, Field-Programmable Gate Arrays (FPGAs) that implement softcore processors, ASICs, portions of one or more of the same, variations or combinations of one or more of the same, or any other suitable physical processor.

Although illustrated as separate elements, the modules described and/or illustrated herein may represent portions of a single module or application. In addition, in certain embodiments, one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive matrices to be transformed, transform the matrices, output a result of the transformation to produce partial sums, use the result of the transformation to produce an output matrix, and store the result of the transformation to perform an inference of a neural network. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving a precision level of each weight associated with each input of a node of a computational model;
   identifying, for each weight, one of a plurality of multiplier groups, wherein each multiplier group comprises a plurality of hardware multipliers of a corresponding bit width, and wherein the corresponding bit width of the plurality of hardware multipliers of the one of the plurality of multiplier groups is sufficient to multiply the weight by the associated input based on the precision level of the weight; and
   multiplying each weight by its associated input using an available hardware multiplier of the one of the plurality of multiplier groups identified for the weight.

2. The method of claim 1, wherein receiving the precision level of the weight associated with each input comprises receiving, for each weight, a sideband signal indicating the precision level of the weight.

3. The method of claim 1, wherein receiving the precision level of the weight associated with each input comprises:
quantizing, prior to identifying, for each weight, one of a plurality of multiplier groups, the weight associated with each input of the node; and
detecting, after the quantizing of the weight associated with each input and prior to identifying, for each weight, one of a plurality of multiplier groups, the precision level of the weight associated with each input.

4. The method of claim 1, wherein the weights range from a maximum negative integer to a maximum positive integer.

5. The method of claim 1, wherein the one of the plurality of multiplier groups for each weight comprises the multiplier group corresponding to the smallest corresponding bit width sufficient to multiply the weight by the associated input.

6. The method of claim 1, wherein:
identifying the one of the plurality of multiplier groups for each weight comprises determining, for one of the weights, that the multiplier group corresponding to the smallest corresponding bit width sufficient to multiply the weight by the associated input has no hardware multipliers currently available; and
the corresponding bit width of the plurality of hardware multipliers of the one of the plurality of multiplier groups is the smallest available bit width larger than the smallest corresponding bit width sufficient to multiply the weight by the associated input.

7. The method of claim 1, wherein identifying one of the plurality of multiplier groups for each weight facilitates the multiplying of the weights and the associated inputs of the node in parallel.

8. The method of claim 1, wherein:
each hardware multiplier of a first multiplier group is an n-by-n hardware multiplier;
each hardware multiplier of a second multiplier group is an m-by-n hardware multiplier;
n is a maximum number of significant bits of the weights of the node; and
m is less than n.

9. The method of claim 8, wherein m and n are different powers of two.

10. The method of claim 1, wherein multiplying each weight of the node by its associated input is performed within a single hardware processing cycle.

11. The method of claim 1, further comprising adding together the products of multiplying each weight of the node by its associated input.

12. The method of claim 11, further comprising:
applying an activation function to the sum of the products of multiplying each weight of the node by its associated input; and
forwarding the result of the activation function as an input for at least one other node of the computational model.

13. The method of claim 1, wherein:
a first number of hardware multipliers in a first multiplier group are of a first corresponding bit width; and
a second number of hardware multipliers in a second multiplier group are of a second corresponding bit width, wherein the first number is less than the second number and the first corresponding bit width is greater than the second corresponding bit width.

14. A processing element comprising:
a plurality of multiplier groups, wherein each multiplier group comprises a plurality of hardware multipliers of a corresponding bit width; and
a multiplier group identification unit that:
receives a precision level of each weight associated with each input of a node of a computational model; and
identifies, for each weight, one of the plurality of multiplier groups, wherein the corresponding bit width of the plurality of hardware multipliers of the one of the plurality of multiplier groups is sufficient to multiply the weight by the associated input based on the precision level of the weight; and
wherein each weight is multiplied by its associated input using an available hardware multiplier of the one of the plurality of multiplier groups identified for the weight.

15. The processing element of claim 14, wherein the multiplier group identification unit receives a sideband signal indicating the precision level of the weight associated with each input of the node.

16. The processing element of claim 14, further comprising a precision level determination unit that:
receives the weight associated with each input of the node;
quantizes the weight associated with each input of the node; and
detects, after quantizing the weight associated with each input, the precision level of the weight associated with each input.

17. The processing element of claim 14, further comprising a hardware accumulator that sums products provided by the hardware multipliers of the processing element.

18. The processing element of claim 14, wherein the one of the plurality of multiplier groups for each weight comprises the multiplier group corresponding to the smallest corresponding bit width sufficient to multiply the weight by the associated input.

19. A system comprising:
a plurality of hardware processing elements that operate as nodes of a computational model, wherein at least one of the hardware processing elements comprises:
a plurality of multiplier groups, wherein each multiplier group comprises a plurality of hardware multipliers of a corresponding bit width; and
a multiplier group identification unit that:
receives a precision level of each weight associated with each input of a node of the computational model; and
identifies, for each weight, one of the plurality of multiplier groups, wherein the corresponding bit width of the plurality of hardware multipliers of the one of the plurality of multiplier groups is sufficient to multiply the weight by the associated input based on the precision level of the weight; and
wherein each weight is multiplied by its associated input using an available hardware multiplier of the one of the plurality of multiplier groups identified for the weight.

* * * * *